US011947618B2

(12) United States Patent
Kline et al.

(10) Patent No.: US 11,947,618 B2
(45) Date of Patent: *Apr. 2, 2024

(54) IDENTIFYING AND STORING RELEVANT USER CONTENT IN A COLLECTION ACCESSIBLE TO USER IN WEBSITE SUBSCRIBED TO SERVICE

(71) Applicant: International Business Machines Corporation, Armonk, NY (US)

(72) Inventors: Anne Kline, Endwell, NY (US); Adam Dickens, Rochester, NY (US); Emre Kavlakoglu, Long Island City, NY (US)

(73) Assignee: International Business Machines Corporation, Armonk, NY (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/128,127

(22) Filed: Dec. 20, 2020

(65) Prior Publication Data

US 2021/0109982 A1 Apr. 15, 2021

Related U.S. Application Data

(63) Continuation of application No. 16/373,318, filed on Apr. 2, 2019, now Pat. No. 10,929,498.

(51) Int. Cl.
*G06F 16/958* (2019.01)
*G06F 3/04817* (2022.01)
(Continued)

(52) U.S. Cl.
CPC ........ *G06F 16/958* (2019.01); *G06F 3/04817* (2013.01); *G06F 16/9535* (2019.01); *G06F 16/9538* (2019.01); *G06F 16/954* (2019.01)

(58) Field of Classification Search
None
See application file for complete search history.

(56) References Cited

U.S. PATENT DOCUMENTS

| 6,029,195 A | 2/2000 | Herz |
| 6,412,073 B1 | 6/2002 | Rangan |

(Continued)

FOREIGN PATENT DOCUMENTS

| CN | 107577821 A | 1/2018 |
| WO | 2008040016 A1 | 4/2008 |

OTHER PUBLICATIONS

Pazzani et al., "Content-Based Recommendation Systems," Part of the Lecture Notes in Computer Science book series, Chapter 10, Springer, 2007, pp. 325-341.

(Continued)

*Primary Examiner* — Michael Roswell
*Assistant Examiner* — Tyler Schallhorn
(74) *Attorney, Agent, or Firm* — Shackelford, Bowen, McKinley & Norton, LLP; Robert A. Voigt, Jr.

(57) ABSTRACT

A method, system and computer program product for maintaining a collection service for websites. A user preference for content desired to be viewed by the user subscribed to the collection service is acquired. Content may then be searched and reviewed both within and outside a website subscribed to the service by the collection service to identify the content of interest to the user using an artificial intelligence system based on the acquired user preference and a rule set. The artificial intelligence system is a learning system that learns the content of interest to the user based on the user's actions. The identified content of interest is then presented to the user in a container within the website subscribed to the service, where the container is a "reusable construct" in that it may appear to the user within any subscribed website.

20 Claims, 5 Drawing Sheets

(51) Int. Cl.
  *G06F 16/9535* (2019.01)
  *G06F 16/9538* (2019.01)
  *G06F 16/954* (2019.01)

(56) References Cited

U.S. PATENT DOCUMENTS

| | | | |
|---|---|---|---|
| 6,460,036 B1 | 10/2002 | Herz | |
| 6,912,505 B2 | 6/2005 | Linden et al. | |
| 7,512,900 B2* | 3/2009 | Lynch | G06F 16/3334 |
| | | | 715/708 |
| 7,526,458 B2* | 4/2009 | Flinn | G06Q 30/0185 |
| | | | 706/12 |
| 7,725,523 B2* | 5/2010 | Bolnick | H04L 67/10 |
| | | | 709/212 |
| 7,881,984 B2 | 2/2011 | Kane, Jr. et al. | |
| 8,135,392 B2* | 3/2012 | Marcellino | H04L 67/60 |
| | | | 455/418 |
| 8,213,912 B2* | 7/2012 | Pomerantz | H04L 67/306 |
| | | | 455/414.1 |
| 8,271,878 B2 | 9/2012 | Kane et al. | |
| 8,326,658 B1* | 12/2012 | Lee | G06Q 30/0603 |
| | | | 705/7.11 |
| 8,370,348 B1 | 2/2013 | Reilly et al. | |
| 8,396,463 B2 | 3/2013 | Marcellino et al. | |
| 8,521,594 B1 | 8/2013 | Skoe et al. | |
| 8,539,376 B2 | 9/2013 | Utsuki et al. | |
| 8,595,186 B1 | 11/2013 | Mandyam et al. | |
| 8,700,604 B2 | 4/2014 | Roseman et al. | |
| 8,725,739 B2 | 5/2014 | Liang et al. | |
| 8,768,760 B1* | 7/2014 | Distefano | G06Q 30/0207 |
| | | | 705/14.1 |
| 8,806,328 B2* | 8/2014 | Oz | G06F 16/958 |
| | | | 707/754 |
| 8,966,407 B2 | 2/2015 | Shacham et al. | |
| 8,996,398 B2* | 3/2015 | DiStefano, III | G06Q 30/0273 |
| | | | 705/14.1 |
| 8,996,629 B1 | 3/2015 | Datar et al. | |
| 9,098,572 B1 | 8/2015 | Reilly et al. | |
| 9,116,995 B2 | 8/2015 | Koperski et al. | |
| 9,122,760 B2* | 9/2015 | Osann, Jr. | G06F 16/951 |
| 9,189,479 B2* | 11/2015 | Spivack | G06F 16/93 |
| 9,262,742 B2 | 2/2016 | Moonka et al. | |
| 9,317,612 B1 | 4/2016 | Camplejohn et al. | |
| 9,367,639 B2* | 6/2016 | Faris | G06F 16/958 |
| 9,430,671 B2* | 8/2016 | Aghasaryan | H04L 9/3236 |
| 9,471,670 B2 | 10/2016 | Roseman et al. | |
| 9,560,002 B1* | 1/2017 | Devasthali | H04L 51/04 |
| 9,578,382 B2 | 2/2017 | Lewis et al. | |
| 9,582,592 B2* | 2/2017 | Mason | G06F 40/143 |
| 9,658,738 B1 | 5/2017 | Park et al. | |
| 9,866,914 B2 | 1/2018 | Lewis et al. | |
| 9,892,468 B1 | 2/2018 | Lam | |
| 10,049,150 B2 | 8/2018 | Liang et al. | |
| 10,185,486 B2* | 1/2019 | Lewis | H04N 21/2543 |
| 10,425,492 B2* | 9/2019 | Comstock | H04L 67/535 |
| 10,498,690 B2* | 12/2019 | Pappu | H04L 51/52 |
| 10,509,827 B1* | 12/2019 | Pattan | H04N 21/478 |
| 10,509,842 B2 | 12/2019 | Zhang et al. | |
| 10,529,035 B2 | 1/2020 | Lam | |
| 10,832,130 B2* | 11/2020 | Green | G06N 3/08 |
| 2002/0019763 A1 | 2/2002 | Linden et al. | |
| 2002/0023230 A1* | 2/2002 | Bolnick | H04L 63/101 |
| | | | 726/28 |
| 2004/0019632 A1 | 1/2004 | McGee et al. | |
| 2005/0177805 A1* | 8/2005 | Lynch | G06F 16/3334 |
| | | | 707/E17.071 |
| 2006/0200432 A1* | 9/2006 | Flinn | G06N 5/048 |
| | | | 706/12 |
| 2007/0288514 A1 | 12/2007 | Reitter et al. | |
| 2008/0126176 A1* | 5/2008 | Iguchi | G06Q 30/0201 |
| | | | 705/7.29 |
| 2008/0172372 A1 | 7/2008 | Shacham et al. | |
| 2008/0243632 A1 | 10/2008 | Kane et al. | |
| 2008/0263439 A1* | 10/2008 | Oz | G06F 16/958 |
| | | | 707/E17.116 |
| 2009/0006974 A1 | 1/2009 | Harinarayan et al. | |
| 2009/0013387 A1 | 1/2009 | Paas et al. | |
| 2009/0043755 A1* | 2/2009 | Faris | G06F 40/103 |
| | | | 707/999.005 |
| 2009/0150388 A1 | 6/2009 | Roseman et al. | |
| 2009/0164408 A1 | 6/2009 | Grigorik et al. | |
| 2009/0171968 A1 | 7/2009 | Kane et al. | |
| 2009/0172551 A1 | 7/2009 | Kane et al. | |
| 2009/0305732 A1* | 12/2009 | Marcellino | H04L 67/60 |
| | | | 455/466 |
| 2010/0211960 A1 | 8/2010 | Sirajuddin et al. | |
| 2010/0311394 A1* | 12/2010 | Pomerantz | H04L 67/04 |
| | | | 455/414.1 |
| 2011/0010307 A1* | 1/2011 | Bates | G06Q 30/02 |
| | | | 705/26.7 |
| 2011/0055763 A1 | 3/2011 | Utsuki et al. | |
| 2012/0054189 A1 | 3/2012 | Moonka et al. | |
| 2012/0109966 A1 | 5/2012 | Liang et al. | |
| 2012/0173645 A1 | 7/2012 | Marcellino et al. | |
| 2012/0254188 A1 | 10/2012 | Koperski et al. | |
| 2012/0290637 A1 | 11/2012 | Perantatos et al. | |
| 2013/0091090 A1* | 4/2013 | Spivack | G06F 16/93 |
| | | | 707/736 |
| 2013/0097279 A1 | 4/2013 | Polis et al. | |
| 2013/0145257 A1 | 6/2013 | Shalabi et al. | |
| 2013/0151982 A1* | 6/2013 | Distefano, III | G06Q 30/0276 |
| | | | 715/744 |
| 2013/0159826 A1* | 6/2013 | Mason | G06F 16/954 |
| | | | 715/205 |
| 2013/0246389 A1* | 9/2013 | Osann, Jr. | G06F 16/9535 |
| | | | 707/710 |
| 2013/0269014 A1 | 10/2013 | Gerber | |
| 2013/0275413 A1* | 10/2013 | Snir | H04L 67/561 |
| | | | 707/722 |
| 2013/0297716 A1 | 11/2013 | Spittle et al. | |
| 2013/0305132 A1* | 11/2013 | Distefano, III | G06Q 30/0273 |
| | | | 715/205 |
| 2013/0326418 A1 | 12/2013 | Utsuki et al. | |
| 2014/0143683 A1 | 5/2014 | Underwood, IV et al. | |
| 2014/0214850 A1 | 7/2014 | Liang et al. | |
| 2014/0229467 A1 | 8/2014 | Roseman et al. | |
| 2014/0245183 A1* | 8/2014 | Lewis | H04N 21/6582 |
| | | | 715/753 |
| 2014/0359490 A1 | 12/2014 | Ma | |
| 2014/0379746 A1 | 12/2014 | Chi et al. | |
| 2015/0007235 A1 | 1/2015 | Lewis et al. | |
| 2015/0135329 A1* | 5/2015 | Aghasaryan | H04L 63/0421 |
| | | | 726/26 |
| 2015/0324449 A1 | 11/2015 | Koperski et al. | |
| 2016/0170623 A1* | 6/2016 | Lewis | H04N 21/6175 |
| | | | 715/845 |
| 2016/0234326 A1 | 8/2016 | Camplejohn et al. | |
| 2017/0012922 A1* | 1/2017 | Devasthali | H04L 43/16 |
| 2017/0013070 A1* | 1/2017 | Comstock | H04L 67/535 |
| 2017/0039272 A1 | 2/2017 | Roseman et al. | |
| 2017/0164063 A1 | 6/2017 | Lewis et al. | |
| 2017/0250930 A1* | 8/2017 | Ben-Itzhak | G06F 3/0488 |
| 2018/0033051 A1* | 2/2018 | Maynard | G06Q 30/0269 |
| 2018/0081503 A1* | 3/2018 | Green | G06N 3/08 |
| 2018/0114280 A1 | 4/2018 | Lam | |
| 2018/0253485 A1* | 9/2018 | Pappu | H04L 67/535 |
| 2018/0293611 A1* | 10/2018 | Chordia | G06N 20/20 |
| 2018/0302358 A1 | 10/2018 | Nambiar et al. | |
| 2018/0365316 A1 | 12/2018 | Liang et al. | |
| 2019/0108533 A1* | 4/2019 | Karelin | G06Q 30/02 |

OTHER PUBLICATIONS

TechCrunch, "Personalize Your Site's Content with MineKey," https://techcrunch.com/2007/08/02/personalize-your-sites-content-with-minkey, Aug. 2, 2007, one page.

Josh Catone, "rollSense: Your Blogroll on Steroids," https://readwrite.com/2007/08/02/rollsense_your_blogroll_on_steroids, Aug. 2, 2007, pp. 1-3.

(56) References Cited

OTHER PUBLICATIONS

Gediminas Adomavicius, "Toward the Next Generation of Recommender Systems: A Survey of the State-of-the-Art and Possible Extensions," IEEE Transactions on Knowledge and Data Engineering, vol. 17, No. 6, Jun. 2005, pp. 734-749.

List of IBM Patents or Patent Applications Treated as Related, Jan. 14, 2021, pp. 1-2.

* cited by examiner

IDENTIFYING AND STORING RELEVANT USER CONTENT IN A COLLECTION ACCESSIBLE TO USER IN WEBSITE SUBSCRIBED TO SERVICE

TECHNICAL FIELD

The present invention relates generally to content collection services, and more particularly to identifying and storing relevant user content in a collection (e.g., collection icon) accessible to the user in a website subscribed to the service maintaining the collection.

BACKGROUND

Users can receive information published by content creators (such creators may be referred to as "publishers") to be read on a regular basis, such as daily, weekly or monthly, for example. Users may do so by subscribing (such users may be referred to as "subscribers") with website providers to create a subscription (a "subscription" indicates the topics or categories of interest to the user) to receive content of interest (e.g., articles, posts) related to particular topics or categories when they visit websites.

SUMMARY

In one embodiment of the present invention, a computer-implemented method for maintaining a collection service for websites comprises acquiring a user preference for content desired to be viewed by a user subscribed to a service. The method further comprises receiving a request from a website to subscribe to the service. The method additionally comprises searching and reviewing content both within and outside the website to identify content of interest to the user based on the acquired user preference and a ruleset, where the ruleset comprises a collection of rules regarding identifying content of interest for the user. Furthermore, the method comprises presenting the identified content of interest in a container on a webpage within the website subscribed to the service, where the container is a reusable construct that appears to the user within any subscribed website as well as within a mobile application after the user accesses the mobile application that is subscribed to the service.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for maintaining a collection service for websites. In one embodiment of the present invention, a user preference for content desired to be viewed by the user subscribed to the collection service is acquired. Such a collection service includes searching and identifying relevant content for subscribed users, which may be presented to the user when the user visits a subscribed website, such as via a container (e.g., briefcase icon) on the website's homepage. Furthermore, such a collection service includes providing generic information to the subscribed websites (such as the website owners) about a group of subscribed users, such as their browsing history. In one embodiment, the user preferences discussed above may be acquired by the user providing such user preferences, or alternatively, may be acquired using artificial intelligence based on analyzing the user's behavior. Content may then be searched and reviewed both within and outside a website subscribed to the service to identify the content of interest to the user based on the acquired user preference and a rule set. For example, such content (e.g., articles, blog posts, tweets, industry news, client information, etc.) may be searched and reviewed on the Internet as well as within the subscribed website. The identified content of interest is then presented to the user in a container (e.g., briefcase icon) within the website subscribed to the service, where the container is a "reusable construct" in that it may appear to the user within any subscribed website. In this manner, the subscription is portable so that the user is able to carry the subscription with them to various websites. That is, the subscription, which contains the topics or categories of interest to the user, is used to identify content of interest for the user regardless of which website is currently being accessed by the user and can be used to populate the container with relevant content, where the container can be displayed in any subscribed website.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with websites, the principles of the present invention may be extended to any application, such as a mobile application, or any smart device, such as an Internet of Things (IoT) device. For example, a subscribed user may be able to view the container within the mobile application after accessing such a mobile application that is subscribed to the service. In another example, a subscribed user may able to view the container (e.g., contains content, such as recipes) on the IoT device (e.g., smart refrigerator) subscribed to the service. A person of ordinary skill in the art would be capable of applying the principles of the present invention to such implementations. Further, embodiments applying the principles of the present invention to such implementations would fall within the scope of the present invention.

Figure 1:
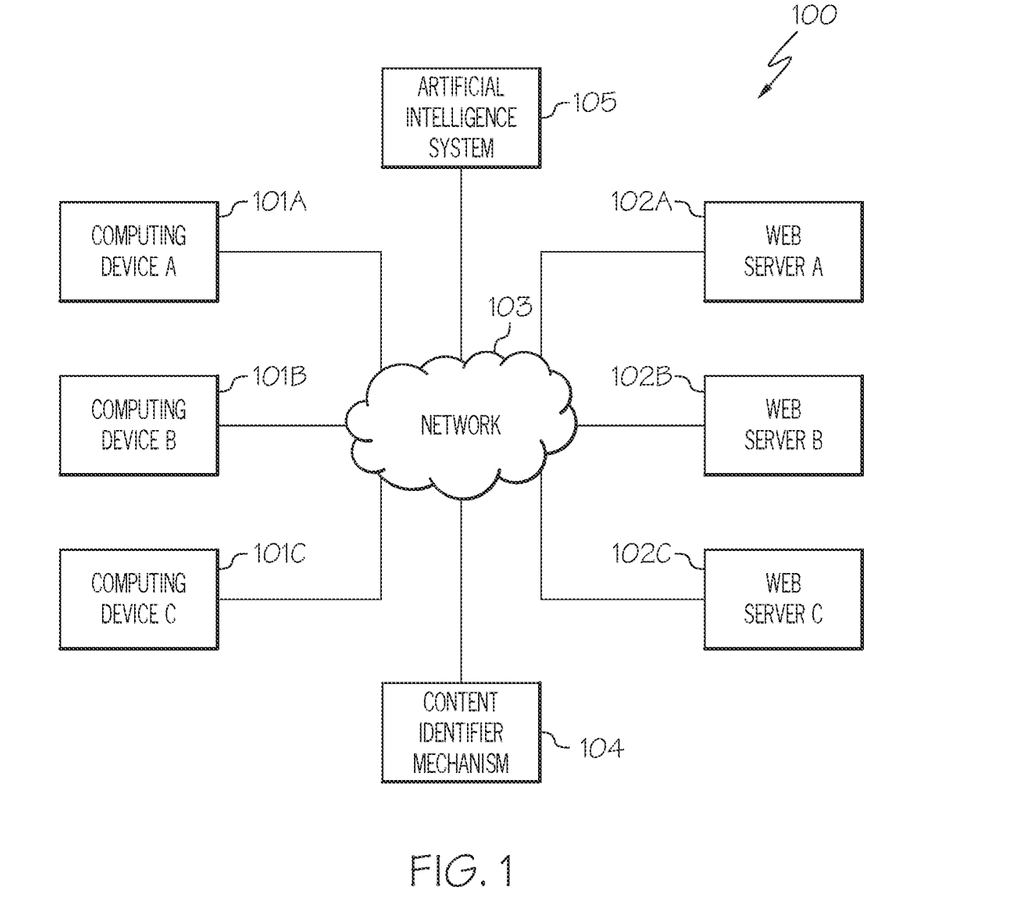
FIG. 1 illustrates a communication system configured in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to one or more web servers 102A-102C (identified as "Web Server A," "Web Server B," and "Web Server C," respectively, in FIG. 1) via a network 103. Computing devices 101A-101C may collectively or individually be referred to as computing devices 101 or computing device 101, respectively. It is noted that both computing devices 101 and the users of computing devices 101 may be identified with element number 101. Furthermore, web servers 102A-102C may collectively or individually be referred to as web servers 102 or web server 102, respectively.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and web servers 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Web server 102 is configured to host websites and serve contents to the World Wide Web. Hence, web servers 102A-102C represent various web servers hosting various websites that are accessible by the users of computing devices 101. Furthermore, web server 102 is configured to process incoming network requests over HTTP (Hypertext Transfer Protocol) and several other related protocols.

System 100 further includes what is referred to herein as a "content identifier mechanism" 104 connected to network 103 by wire or wirelessly. Content identifier mechanism 104 is configured to provide a collection service for subscribed websites (or applications, such as mobile applications) and subscribed users. Such a collection service includes searching and identifying relevant content for subscribed users (e.g., user of computing device 101A subscribed to the service), which may be presented to the user when the user visits a subscribed website, such as via a container displayed on the website's homepage. Furthermore, such a collection service includes providing generic information to the subscribed websites (such as the website owners) about a group of subscribed users, such as their browsing history. Such information may be used by the subscribed websites to provide more targeted content to the users visiting their websites. A further description of the functionality of content identifier mechanism 104 is provided further below in connection with FIGS. 3-7. A description of the hardware configuration of content identifier mechanism 104 is provided below in connection with FIG. 2.

Furthermore, system 100 may include an artificial intelligence system 105 (e.g., IBM Watson®) connected to network 103, which may be used by content identifier mechanism 104 to determine the user preferences for content to be viewed by the user subscribed to the service, which may be expressed as categories of interest, as well as identifying relevant content to be viewed by the user based on the user's categories of interest.

System 100 is not to be limited in scope to any one particular network architecture. System 100 may include any number of computing devices 101, web servers 102, networks 103, content identifier mechanisms 104 and artificial intelligence systems 105. Furthermore, while FIG. 1 illustrates content identifier mechanism 104 and artificial intelligence system 105 as being separate physical devices, some or all of the functionality of content identifier mechanism 104 and/or artificial intelligence system 105 may reside in computing device 101 and/or web server 102.

Figure 2:
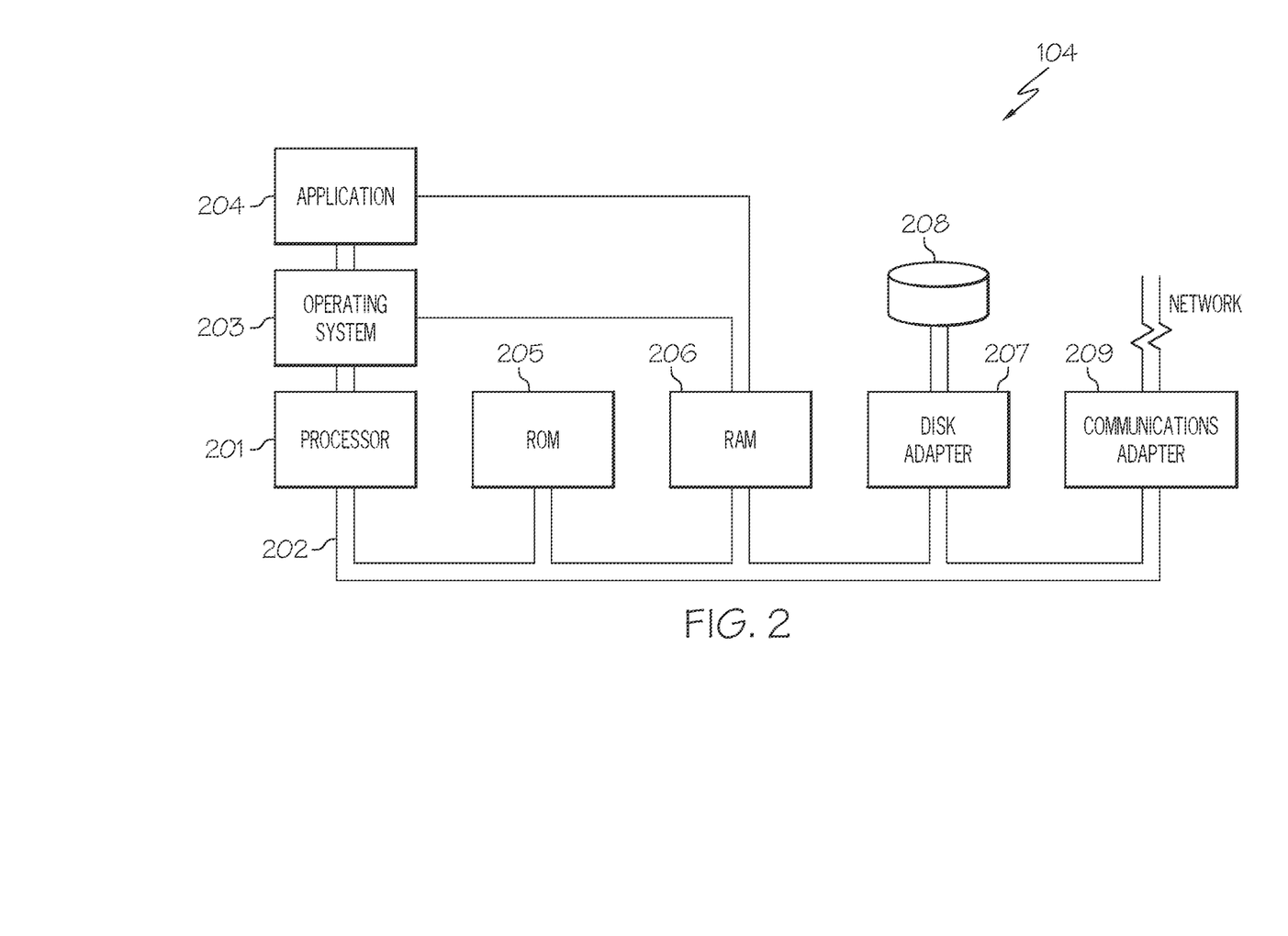
FIG. 2 illustrates an embodiment of the present invention of a hardware configuration of a content identifier mechanism which is representative of a hardware environment for practicing the present invention.

Referring now to FIG. 2, FIG. 2 illustrates a hardware configuration of content identifier mechanism 104 (FIG. 1) which is representative of a hardware environment for practicing the present invention. Referring to FIG. 2, content identifier mechanism 104 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for providing a collection service for subscribed websites and users as discussed below in association with FIGS. 3-7.

Referring again to FIG. 2, read-only memory ("ROM") 205 is connected to system bus 202 and includes a basic input/output system ("BIOS") that controls certain basic functions of content identifier mechanism 104. Random access memory ("RAM") 206 and disk adapter 207 are also connected to system bus 202. It should be noted that software components including operating system 203 and application 204 may be loaded into RAM 206, which may be content identifier mechanism's 104 main memory for execution. Disk adapter 207 may be an integrated drive electronics ("IDE") adapter that communicates with a disk unit 208, e.g., disk drive. It is noted that the program for providing a collection service for subscribed websites and users, as discussed below in association with FIGS. 3-7, may reside in disk unit 208 or in application 204.

Content identifier mechanism 104 may further include a communications adapter 209 connected to bus 202. Communications adapter 209 interconnects bus 202 with an outside network (e.g., network 103 of FIG. 1) thereby allowing content identifier mechanism 104 to communicate with computing devices 101 and web servers 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Users are currently inundated with too much information published by content creators (such creators may be referred to as "publishers") to be read on a daily basis; however, such users still have a need to keep up with the latest information. As a result, users may subscribe (such users may be referred to as "subscribers") with website providers to create a subscription (a "subscription" indicates the topics or categories of interest to the user) to receive content of interest (e.g., articles, posts) related to particular topics or categories when they visit websites. However, such users are not able to carry their subscription with them to other websites. As a result, the user will have to specify his/her preferences each time the user visits a different website, and furthermore, such preferences may vary based on the organizational constructs of these websites. Such a process is laborsome and inefficient. As a result of such a laborsome and inefficient process, website providers have a low subscriber participation rate, which prevents the website providers from obtaining data about the user (e.g., user behavior), which may be used to provide content of interest to the user. Consequently, there is not currently a means for enabling the subscription to follow the user across different websites to identify content of interest for the user.

Figure 3:
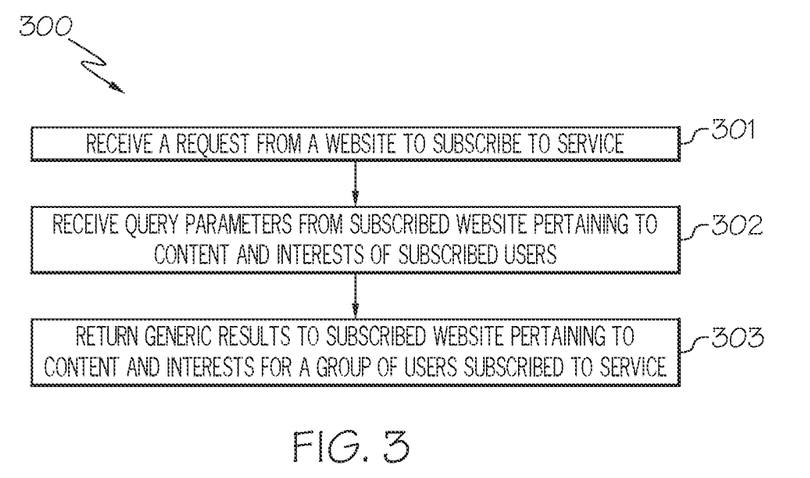
FIG. 3 is a flowchart of a method for subscribed websites to obtain generic information pertaining to a group of subscribed users in accordance with an embodiment of the present invention.
Figure 4:
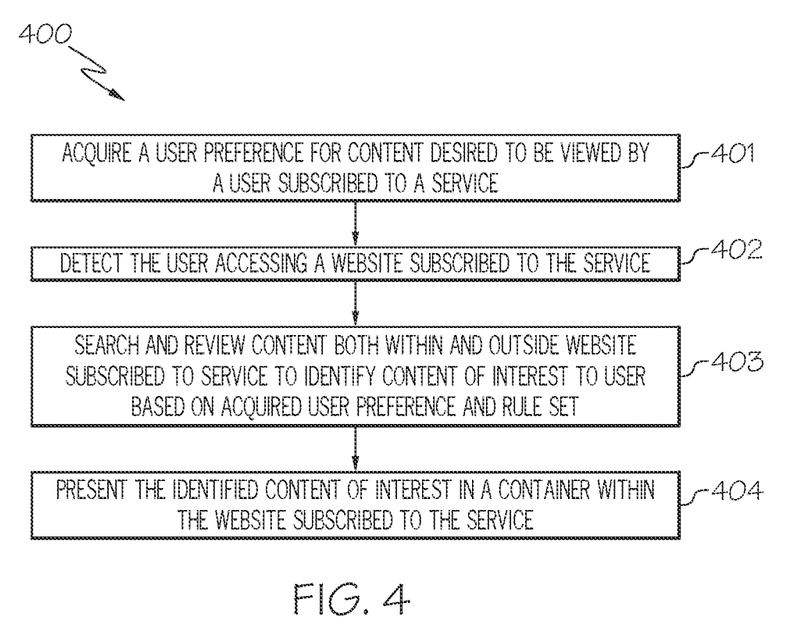
FIG. 4 is a flowchart of a method for storing targeted, meaningful content in a collection in accordance with an embodiment of the present invention.
Figure 5:
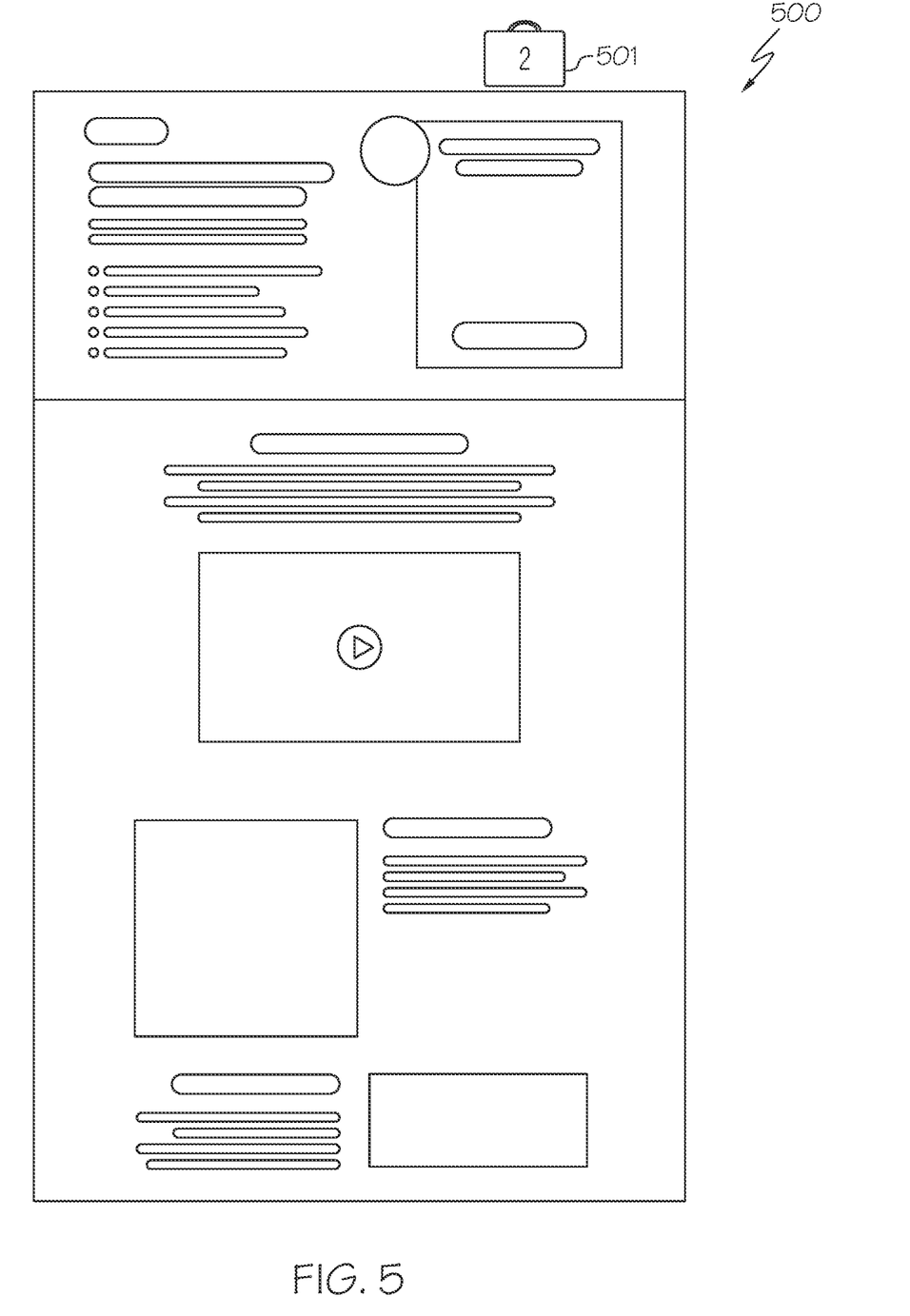
FIG. 5 illustrates a screenshot of a webpage of a subscribed website containing a container indicating the number of documents currently in the container to be viewed by the user in accordance with an embodiment of the present invention.
Figure 6:
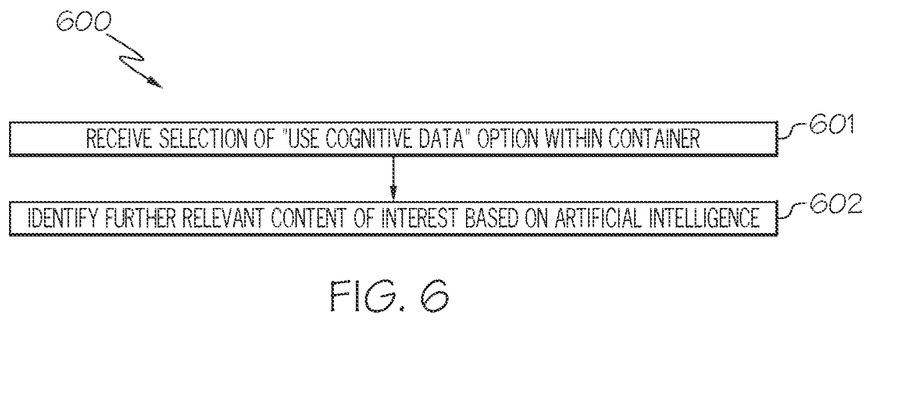
FIG. 6 is a flowchart of a method for further identifying relevant content to be presented in the container in response to the selection of the "use cognitive data" option within the container in accordance with an embodiment of the present invention.
Figure 7:
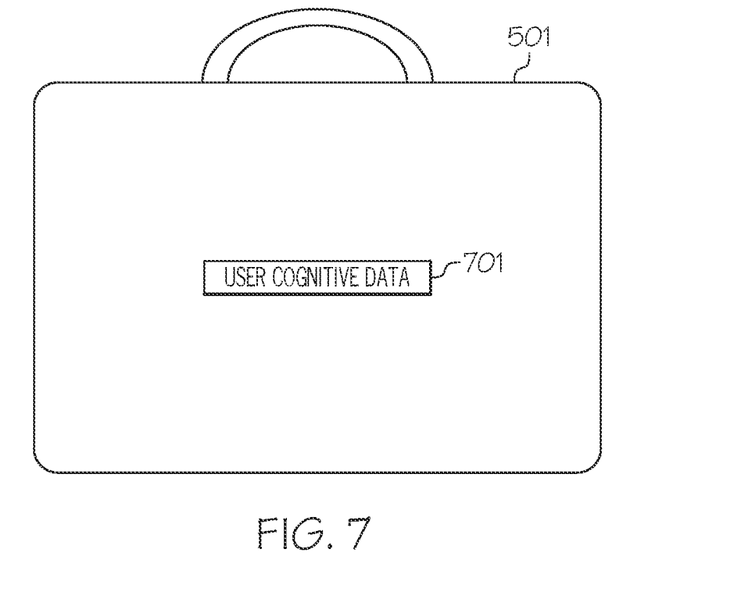
FIG. 7 illustrates the container containing the option of using cognitive data in accordance with an embodiment of the present invention.

The embodiments of the present invention provide a means for enabling the subscription to follow the user across different websites to identify content of interest for the user as discussed below in connection with FIGS. 3-7. FIG. 3 is a flowchart of a method for subscribed websites to obtain generic information pertaining to a group of subscribed users. FIG. 4 is a flowchart of a method for storing targeted, meaningful content in a collection. FIG. 5 illustrates a screenshot of a webpage of a subscribed website containing a container indicating the number of documents currently in the container to be viewed by the user. FIG. 6 is a flowchart of a method for further identifying relevant content to be presented in the container in response to the selection of the "use cognitive data" option within the container. FIG. 7 illustrates the container containing the option of using cognitive data.

As stated above, FIG. 3 is a flowchart of a method 300 for subscribed websites to obtain generic information pertaining to a group of subscribed users, such as their browsing history, in accordance with an embodiment of the present invention.

Referring to FIG. 3, in conjunction with FIGS. 1-2, in step 301, content identifier mechanism 104 receives a request from a website (e.g., website hosted by web server 102A) to subscribe to the "service." The "subscribed service," as used herein, refers to providing generic information to the subscribed websites (such as to the website owners) about a group of subscribed users, such as their browsing history. Such information may be used by the subscribed websites to provide more targeted content to the users. Furthermore, the "subscribed service," as used herein, refers to searching and identifying relevant content for subscribed users (e.g., user of computing device 10A subscribed to the service), which may be presented to the user when the user visits a subscribed website, such as via a container displayed on the website's homepage.

In one embodiment, the subscribed service is a software as a service (SaaS) hosted in the cloud.

In one embodiment, the request to subscribe to the service includes a request to subscribe to one or more micro-services, where each of the micro-services corresponds to a category of interest of the subscribed users, such as the subscribed users who have visited the subscribed website. In one embodiment, the set of micro-services is pluggable, such that artificial intelligence capabilities could identify relevant content based on the category of interest (e.g., sports, weather, news) that a group of subscribed users identify or that are nominated to the users by artificial intelligence system 105 for consideration and acceptance by the users. Each end user (user of computing device 101) can individually select what content preferences they have, or say "yes" or "no" to suggested content by artificial intelligence system 105, and if "yes," make that category available via the micro-service.

In one embodiment, a set of application programming interfaces are featured as the subscribed micro-services.

In one embodiment, the service can be subscribed by the website owner, such as via a user interface.

It is noted that additional details concerning payment of the service in order to subscribe to the service are not discussed herein for the sake of brevity, where such details are known by a person of ordinary skill in the art.

In step 302, content identifier mechanism 104 receives query parameters from the subscribed website pertaining to the content and interests of the subscribed users, such as the subscribed users who have visited the subscribed website. In one embodiment, such query parameters relate to the subscribed micro-services (i.e., relate to the categories of interest of the subscribed users made available via the micro-services).

In step 303, content identifier mechanism 104 returns generic results to the subscribed website pertaining to the content and interests for a group of users subscribed to the service. In one embodiment, such generic results include a set of content related information, which allows the website owner to provide a more personalized experience for the users visiting the website by being able to have access to the users' interest levels across a broader spectrum of content than what has surfaced within the website. In one embodiment, such generic results are about the users using the system, such as those visiting the subscribed website, rather than an identifiable user to preserve confidentiality and privacy.

In one embodiment, the subscribed service is populated with a set of user preferences as to the content desired to be viewed by the subscribed users (discussed further below in connection with FIG. 4), such as those users visiting the subscribed website. In one embodiment, such a set of user preferences are "generic" in the sense that individual user preferences (e.g., preferences for the user of computing device 101A) are not specifically identified in the set of user preferences. Instead, such a set of user preferences are formed based on the preferences across a group of subscribed users visiting the subscribed website.

In addition to the websites (website owners) subscribing to the service, individual users (e.g., users of computing devices 101) may subscribe to the service so that relevant content is available for them to review when the user visits a subscribed website, such as via a container displayed on the website's homepage, as discussed below in connection with FIG. 4.

FIG. 4 is a flowchart of a method 400 for storing targeted, meaningful content in a collection, referred to herein as the "container" or a "container icon," in accordance with an embodiment of the present invention.

Referring to FIG. 4, in conjunction with FIGS. 1-3, in step 401, content identifier mechanism 104 acquires a user preference for content desired to be viewed by a user (e.g., user of computing device 101A) subscribed to the service. In one embodiment, such user preferences may be acquired by content identifier mechanism 104 by the user providing such user preferences directly to content identifier mechanism 104, such as via a user interface. In another embodiment, such user preferences may be acquired by content identifier mechanism 104 using artificial intelligence system 105 based on analyzing the user's behavior. For example, the user's browsing history may be analyzed by artificial intelligence system 105 to determine the interests of the user. For instance, the user may browse various baseball websites. As a result, it may be inferred that the user has an interest in following baseball. In another example, the user may have purchased various Detroit Red Wings® memorabilia on various websites. As a result, it may be inferred that the user has an interest in following the Detroit Red Wings® hockey team. In one embodiment, such interests may be classified into categories of interest (e.g., baseball, Detroit Red Wings® hockey team). Other examples include identifying the user's preferences by artificial intelligence system 105 based on what the user is taking the time to read as well as their indications of "liking" a selected content. For example, artificial intelligence system 105 may determine that the user is taking time to read a post pertaining to the Detroit Tigers® baseball team, and therefore, concluded that the user has an interest in following the Detroit Tigers® baseball team. In one embodiment, such user preferences are dynamic in that they are constantly changing (or least have the potential to constantly change).

In step 402, content identifier mechanism 104 detects the user (e.g., user of computing device 101) accessing a website subscribed to the service. For example, content identifier mechanism 104 may detect a subscribed user (e.g., user of computing device 101A) accessing a subscribed website (e.g., website hosted by web server 102A) based on the user's computing device 101 requesting to access a resource (e.g., webpage of website) located at a specified uniform resource locator (URL) provided by the browser of computing device 101. The Internet Protocol (IP) address assigned to the user's computing device 101 as well as to the web server 102 hosting the website may be used to confirm that the user and the website are subscribed to the service. In one embodiment, such information (the IP addresses of subscribed websites and users) may reside in a data structure, which may be stored in a storage device (e.g., memory 205, disk unit 208).

In step 403, content identifier mechanism 104 searches and reviews the content both within and outside the website subscribed to the service to identify the content of interest to the user based on the acquired user preference and a rule set. For example, such content (e.g., articles, blog posts, tweets, industry news, client information, etc.) may be searched and reviewed on the Internet as well as within the subscribed website.

In one embodiment, content identifier mechanism 104 utilizes artificial intelligence system 105 for identifying the user's content of interest based on the acquired user preference and the rule set. In one embodiment, artificial intelligence system 105 determines the semantic similarity between the topics in the found documents with the categories of interests identified in the acquired user preference. In one embodiment, such semantic similarity may be identified utilizing natural language processing (e.g., WordNet based word similarity). The rule set may then be used to determine how semantically similar the topic in the found document needs to be with the category of interest of the user in order for the found document to be identified as being a content of interest to the user.

A "rule set," as used herein, refers to a collection of rules regarding identifying content of interest for the user. Such rules may be established by the user or by an administrator. For example, as discussed above, such rules may include the required degree of similarity between the topics discussed in a found document with respect to a category of interest of the user. For instance, a rule may require that the semantic similarity between the topic discussed in the found document with the category of interest of the user needs to exceed a threshold value before the found document is selected as a content of interest.

In one embodiment, when a rule set is executed, all the rules in the rule set are evaluated at the same time against the data. The rule set either passes or fails a percent of the rules in the rule set.

In one embodiment, such identified content of interest may be ranked (or scored) based on how semantically similar the identified content of interest is with the user's categories of interest. The more semantically similar is the identified content of interest with the user's categories of interest, the higher the ranking (or scoring) is the identified content of interest.

In step 404, content identifier mechanism 104 presents the identified content of interest in a container within the website subscribed to the service as shown in FIG. 5. In one embodiment, such identified content of interest is presented in the container based on their ranking, where those content of interest with a higher ranking are presented prior to those with a lower ranking. Such a container may be said to be a "reusable construct" in that it may appear to the user within any subscribed website. In this manner, the subscription is portable so that the user is able to carry the subscription with them to various websites. That is, the subscription, which contains the topics or categories of interest to the user, is used to identify content of interest for the user regardless of which website is currently being accessed by the user and can be used to populate the container with relevant content, where the container can be displayed in any subscribed website.

FIG. 5 illustrates a screenshot of a webpage of a subscribed website containing a container (e.g., briefcase icon) indicating the number of documents currently in the container (e.g., briefcase) to be viewed by the user in accordance with an embodiment of the present invention.

Referring to FIG. 5, the screenshot of the webpage 500 includes a container 501, such as a briefcase icon, indicating that there are two documents currently in the container (e.g., briefcase) to be viewed by the user (e.g., user of computing device 101A).

Referring to FIGS. 1, 4 and 5, in one embodiment, the content in container 501 (e.g., briefcase icon) changes dynamically, based on what artificial intelligence system 105 (such as IBM's Watson®) learns about the user's most read articles or posts or interest areas, and the user can provide feedback on the meaningfulness of the artificial intelligence selected content via a liking type mechanism. For example, the user can indicate whether the user "liked" the selected content for the user to view.

In one embodiment, container 501 (e.g., briefcase icon) represents a "cognitive container," whereby the user is able to set up parameters for the container, such as the time range for storing active content in the container; allowing items older than a certain number of days to be moved to an archive for later retrieval, if desired; and limiting the number of items to be contained in the container. In addition, as discussed above, cognitive/artificial intelligence services 105 can be used to learn from the user's pattern of interest in the content, and only include content in container 501 (e.g., briefcase icon) that should meet a high scoring rule for the user as well as based on metrics tied to what content the user has read. The user can "like" the content, to help the artificial intelligence service 105 learn more about what information will interest the user. As a result, container 501 (e.g., briefcase icon) is filled with only the information that is highly ranked that should be of interest to the user. Furthermore, in one embodiment, container 501 is purged automatically so the user does not have to waste time cleaning it out.

Additionally, in one embodiment, container 501 has a feature that enables the user (e.g., user of computing device 101A) to enable further relevant content of interest to be immediately found at that point in time as discussed below in connection with FIG. 6.

FIG. 6 is a flowchart of a method 600 for further identifying relevant content to be presented in the container (e.g., briefcase icon) in response to the selection of the "use cognitive data" option within the container (see element 501 of FIG. 5) in accordance with an embodiment of the present invention.

Referring to FIG. 6, in conjunction with FIGS. 1-5, in step 601, content identifier mechanism 104 receives a selection of the "use cognitive data" option within container 501 (e.g., briefcase icon) as shown in FIG. 7.

FIG. 7 illustrates container 501 (e.g., briefcase icon) containing the option 701 of using cognitive data in accordance with an embodiment of the present invention.

Returning to FIG. 6, in conjunction with FIGS. 1-5 and 7, upon the user selecting such an option, in step 602, content identifier mechanism 104 identifies further relevant content of interest based on artificial intelligence using artificial intelligence system 105.

For example, once such a selection is enabled by the user (and causes container 501 to be cognitive), the following may be performed by content identifier mechanism 104 using the services of artificial intelligence system 105, such services including (1) IBM Watson® text to speech service, such as to read RSS data to the user; (2) IBM Watson® natural language to comprehend user habits; (3) IBM Watson® assistant with discovery to take input from the user and ask simple questions to build a cognitive search solution which would feed IBM Watson® news intelligence application programming interface (API); (4) IBM Watson® news intelligence which would be used to interact with the news to identify top entities (e.g., people, topics and companies); (5) IBM Watson® visual recognition which would enable the user to choose images that they "like" and explain what the user is looking for; and (6) IBM Watsont alchemy language API which parses the tracked metrics data from the website or application activities. In one embodiment, IBM Watson® alchemy language API may parse data containing different types of data and then reorganize the data based on pre-programmed rule sets or automatically by a properly designed framework. In one embodiment, the IBM Watson® alchemy language API accomplishes such a feature by reviewing people, places, companies, topics, facts, relationships, authors and languages within the topics and descriptions of the data consumed by the user.

Once the new items are in the user's container 501, there may be an auto archiving feature, which is adjustable by the user. For example, after five days of not being reviewed by the user, such documents would be moved to another list ("soon to be archived"), where the "soon to be archived" list would be removed from container 501 within a user-selected number of days (e.g., thirty days).

In one embodiment, the user (e.g., user of computing device 101) could respond with a "like" or a "dislike" of the presented content, where such results may be provided to artificial intelligence system 105 to improve its analysis in identifying relevant content for the user.

In one embodiment, the user may indicate a category of interest within container 501. For example, a website that sells pet supplies may subscribe to the service. A subscribed user may visit this website and select container 501. Within container 501, the user may indicate an interest in Siamese cats (e.g., a search field may exist within container 501 that allows the user to insert topics of interest). Content identifier mechanism 104 may then use artificial intelligence system 105 to locate content relating to Siamese cats, and, if it finds such content, will make it available the next time the user enters into the container section 501 of this website or another subscribed website.

As discussed above, embodiments of the present invention provide the means for enabling the subscription to follow the user across different websites to identify content of interest for the user.

Furthermore, the present invention improves the technology or technical field involving content collection systems. As discussed above, users are currently inundated with too much information published by content creators (such creators may be referred to as "publishers") to be read on a daily basis; however, such users still have a need to keep up with the latest information. As a result, users may subscribe (such users may be referred to as "subscribers") with website providers to create a subscription (a "subscription" indicates the topics or categories of interest to the user) to receive content of interest (e.g., articles, posts) related to particular topics or categories when they visit websites. However, such users are not able to carry their subscription with them to other websites. As a result, the user will have to specify his/her preferences each time the user visits a different website, and furthermore, such preferences may vary based on the organizational constructs of these websites. Such a process is laborsome and inefficient. As a result of such a laborsome and inefficient process, website providers have a low subscriber participation rate, which prevents the website providers from obtaining data about the user (e.g., user behavior), which may be used to provide content of interest to the user. Consequently, there is not currently a means for enabling the subscription to follow the user across different websites to identify content of interest for the user.

The present invention improves such technology by enabling the subscription to follow the user across different websites to identify content of interest for the user. A service may be subscribed by both users and websites, where such a subscribed service involves providing generic information to the subscribed websites (such as to the website owner) about a group of subscribed users, such as their browsing history, as well as involves searching and identifying relevant content for subscribed users (e.g., user of computing device 10A subscribed to the service), which may be presented to the user when the user visits a subscribed website, such as via a container (e.g., briefcase icon) on the website's homepage. Such relevant content may be identified by an artificial intelligence system searching and reviewing content both within the subscribed website as well as outside the subscribed website using the user's preferences and a rule set. Such relevant content may then be presented to the user via a container (e.g., briefcase icon) within the subscribed website. In this manner, there is an improvement in the technical field of content collection systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for maintaining a collection service for websites, the method comprising:
acquiring a user preference for content desired to be viewed by a user subscribed to a service;
receiving a request from a website to subscribe to said service;
searching and reviewing content both within and outside said website to identify content of interest to said user based on said acquired user preference and a ruleset, wherein said ruleset comprises a collection of rules regarding identifying content of interest for said user, wherein said rules comprise a required degree of semantic similarity between a topic discussed in said content reviewed and a category of interest identified in said acquired user preference in order for said content to be identified as said content of interest to said user, wherein said semantic similarity is identified using natural language processing;
presenting said identified content of interest in a container on a webpage within said website subscribed to said service, wherein said container is a reusable construct that appears to said user within any subscribed website as well as within a mobile application after said user accesses said mobile application that is subscribed to said service, wherein said container is presented on said webpage as an icon which displays a number of documents currently in said container to be viewed by said user, wherein, in response to items in said container not being reviewed by said user within a user-designated number of days, said items are moved to a list in said container, wherein said list is removed from said container within a user-designated number of days; and
receiving a user selection pertaining to a time range for storing archive content in said container.

2. The method as recited in claim 1 further comprising:
receiving a request from said website to subscribe to one or more micro-services, wherein each of said one or more micro-services corresponds to a category of interest of a group of subscribed users, wherein said one or more micro-services are pluggable such that artificial intelligence capabilities identify said content of interest for said user based on a category of interest that said group of subscribed users identify.

3. The method as recited in claim 1 further comprising:
receiving query parameters from said website pertaining to content and interests of subscribed users, wherein said query parameters relate to categories of interest of said subscribed users made available via micro-services; and
returning generic results to said website pertaining to content and interests for a group of users subscribed to said service, wherein specific users are not identified in said returned generic results.

4. The method as recited in claim 1 further comprising:
receiving a selection of an option depicted as a graphical representation within said container to perform a further search to identify further relevant content of interest using artificial intelligence.

5. The method as recited in claim 1, wherein said user preference for content desired to be viewed by said user is acquired via artificial intelligence and/or directly provided by said user.

6. The method as recited in claim 1 further comprising:
receiving a user selection pertaining to moving items in said container that are older than a certain number of days to an archive for later retrieval; and
receiving a user selection pertaining to a number of items to be contained in said container.

7. The method as recited in claim 1 further comprising:
receiving an indication of a category of interest within said container from said user;
using artificial intelligence to locate content related to said indicated category of interest; and
providing said located content to said user at a following time said user accesses said container.

8. A computer program product for maintaining a collection service for websites, the computer program product comprising one or more computer readable storage mediums having program code embodied therewith, the program code comprising programming instructions for:
acquiring a user preference for content desired to be viewed by a user subscribed to a service;
receiving a request from a website to subscribe to said service;
searching and reviewing content both within and outside said website to identify content of interest to said user based on said acquired user preference and a ruleset, wherein said ruleset comprises a collection of rules regarding identifying content of interest for said user, wherein said rules comprise a required degree of semantic similarity between a topic discussed in said content reviewed and a category of interest identified in said acquired user preference in order for said content to be identified as said content of interest to said user, wherein said semantic similarity is identified using natural language processing;
presenting said identified content of interest in a container on a webpage within said website subscribed to said service, wherein said container is a reusable construct that appears to said user within any subscribed website as well as within a mobile application after said user accesses said mobile application that is subscribed to said service, wherein said container is presented on said webpage as an icon which displays a number of documents currently in said container to be viewed by said user, wherein, in response to items in said container not being reviewed by said user within a user-designated number of days, said items are moved to a list in said container, wherein said list is removed from said container within a user-designated number of days; and
receiving a user selection pertaining to a time range for storing archive content in said container.

9. The computer program product as recited in claim 8, wherein the program code further comprises the programming instructions for:
receiving a request from said website to subscribe to one or more micro-services, wherein each of said one or more micro-services corresponds to a category of interest of a group of subscribed users, wherein said one or more micro-services are pluggable such that artificial intelligence capabilities identify said content of interest for said user based on a category of interest that said group of subscribed users identify.

10. The computer program product as recited in claim 8, wherein the program code further comprises the programming instructions for:
    receiving query parameters from said website pertaining to content and interests of subscribed users, wherein said query parameters relate to categories of interest of said subscribed users made available via micro-services; and
    returning generic results to said website pertaining to content and interests for a group of users subscribed to said service, wherein specific users are not identified in said returned generic results.

11. The computer program product as recited in claim 8, wherein the program code further comprises the programming instructions for:
    receiving a selection of an option depicted as a graphical representation within said container to perform a further search to identify further relevant content of interest using artificial intelligence.

12. The computer program product as recited in claim 8, wherein said user preference for content desired to be viewed by said user is acquired via artificial intelligence and/or directly provided by said user.

13. The computer program product as recited in claim 8, wherein the program code further comprises the programming instructions for:
    receiving a user selection pertaining to moving items in said container that are older than a certain number of days to an archive for later retrieval; and
    receiving a user selection pertaining to a number of items to be contained in said container.

14. The computer program product as recited in claim 8, wherein the program code further comprises the programming instructions for:
    receiving an indication of a category of interest within said container from said user;
    using artificial intelligence to locate content related to said indicated category of interest; and
    providing said located content to said user at a following time said user accesses said container.

15. A system, comprising:
    a memory for storing a computer program for maintaining a collection service for websites; and
    a processor connected to said memory, wherein said processor is configured to execute program instructions of the computer program comprising:
    acquiring a user preference for content desired to be viewed by a user subscribed to a service;
    receiving a request from a website to subscribe to said service;
    searching and reviewing content both within and outside said website to identify content of interest to said user based on said acquired user preference and a ruleset, wherein said ruleset comprises a collection of rules regarding identifying content of interest for said user, wherein said rules comprise a required degree of semantic similarity between a topic discussed in said content reviewed and a category of interest identified in said acquired user preference in order for said content to be identified as said content of interest to said user, wherein said semantic similarity is identified using natural language processing;
    presenting said identified content of interest in a container on a webpage within said website subscribed to said service, wherein said container is a reusable construct that appears to said user within any subscribed website as well as within a mobile application after said user accesses said mobile application that is subscribed to said service, wherein said container is presented on said webpage as an icon which displays a number of documents currently in said container to be viewed by said user, wherein, in response to items in said container not being reviewed by said user within a user-designated number of days, said items are moved to a list in said container, wherein said list is removed from said container within a user-designated number of days; and
    receiving a user selection pertaining to a time range for storing archive content in said container.

16. The system as recited in claim 15, wherein the program instructions of the computer program further comprise:
    receiving a request from said website to subscribe to one or more micro-services, wherein each of said one or more micro-services corresponds to a category of interest of a group of subscribed users, wherein said one or more micro-services are pluggable such that artificial intelligence capabilities identify said content of interest for said user based on a category of interest that said group of subscribed users identify.

17. The system as recited in claim 15, wherein the program instructions of the computer program further comprise:
    receiving query parameters from said website pertaining to content and interests of subscribed users, wherein said query parameters relate to categories of interest of said subscribed users made available via micro-services; and
    returning generic results to said website pertaining to content and interests for a group of users subscribed to said service, wherein specific users are not identified in said returned generic results.

18. The system as recited in claim 15, wherein the program instructions of the computer program further comprise:
    receiving a selection of an option depicted as a graphical representation within said container to perform a further search to identify further relevant content of interest using artificial intelligence.

19. The system as recited in claim 15, wherein said user preference for content desired to be viewed by said user is acquired via artificial intelligence and/or directly provided by said user.

20. The system as recited in claim 15, wherein the program instructions of the computer program further comprise:
    receiving a user selection pertaining to moving items in said container that are older than a certain number of days to an archive for later retrieval; and
    receiving a user selection pertaining to a number of items to be contained in said container.

* * * * *